US012650630B2

(12) United States Patent
Dong et al.

(10) Patent No.: US 12,650,630 B2
(45) Date of Patent: Jun. 9, 2026

(54) METHOD FOR PREPARING PN JUNCTION, PN JUNCTION, AND MODULATOR

(71) Applicant: Huawei Technologies Co., Ltd., Shenzhen (CN)

(72) Inventors: Zhen Dong, Dongguan (CN); Yanbo Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 18/477,552

(22) Filed: Sep. 29, 2023

(65) Prior Publication Data

US 2024/0019756 A1 Jan. 18, 2024

Related U.S. Application Data

(63) Continuation of application No. PCT/CN2022/084719, filed on Apr. 1, 2022.

(30) Foreign Application Priority Data

Apr. 7, 2021 (CN) .......................... 202110374346.8

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01)

(58) Field of Classification Search
CPC ................................ G02F 1/212; G02F 1/2257
See application file for complete search history.

(56) References Cited

U.S. PATENT DOCUMENTS 8,149,493 B2 * 4/2012 Chen ....................... G02F 1/025
385/130
10,048,518 B2 * 8/2018 Ayazi .................... G02F 1/2255
(Continued)

FOREIGN PATENT DOCUMENTS

CN 104393133 A 3/2015
CN 110989213 A 4/2020
WO 2016150263 A1 9/2016

OTHER PUBLICATIONS

Marco Passoni,et al, "Optimizing an interleaved p-n junction to reduce energy dissipation in silicon slow-light modulators", vol. 8, No. 4 / Apr. 2020/Photonics Research, Mar. 13, 2020, total 11 pages.
(Continued)

*Primary Examiner* — Rhonda S Peace
(74) *Attorney, Agent, or Firm* — Slater Matsil, LLP

(57) ABSTRACT

A PN junction, a method for preparing a PN junction, and a modulator are disclosed. The PN junction includes a slab waveguide layer and a plurality of waveguides. The slab waveguide layer includes P-type doped regions and N-type doped regions, and a carrier-depletion region in a shape of S is formed at a boundary between the two types of regions. Each of the plurality of waveguides arranged at intervals includes a P-type doped region and an N-type doped region, and one carrier-depletion region is formed at a boundary between the two regions. Projections of the P-type doped regions, the N-type doped regions, and the carrier-depletion regions of the plurality of waveguides arranged at intervals on a surface of a slab waveguide region basically coincide with projections of corresponding regions of the slab waveguide layer on the surface of the slab waveguide region.

20 Claims, 10 Drawing Sheets

(56)     References Cited

U.S. PATENT DOCUMENTS

| 10,151,941 | B2 * | 12/2018 | Ishikura | .................. | G02F 1/025 |
| 2011/0206313 | A1 * | 8/2011 | Dong | ..................... | G02F 1/025 |
| | | | | | 385/2 |
| 2014/0153859 | A1 * | 6/2014 | Akiyama | ................ | G02F 1/025 |
| | | | | | 385/2 |
| 2016/0062156 | A1 * | 3/2016 | Baehr-Jones | .......... | G02F 1/015 |
| | | | | | 385/3 |

OTHER PUBLICATIONS

Diego Perez-Galacho,et al, "Silicon modulator based on interleaved capacitors in subwavelength grating waveguides", Silicon Photonics and Photonic Integrated Circuits V, edited by Laurent Vivien, Lorenzo Pavesi, Stefano Pelli, Proc. of SPIE vol. 9891, 989112-6, 2016 SPIE CCC, doi: 10.1117/12.2228843, May 20, 2016, total 6 pages.

* cited by examiner

1200

1201-A    1100-A    1201-B

Coupler    Coupler

1100-B

1300

1301

1400

1302

METHOD FOR PREPARING PN JUNCTION, PN JUNCTION, AND MODULATOR

CROSS-REFERENCE TO RELATED APPLICATIONS

This application is a continuation of International Application No. PCT/CN2022/084719, filed on Apr. 1, 2022, which claims priority to Chinese Patent Application No. 202110374346.8, filed on Apr. 7, 2021. The disclosures of the aforementioned applications are hereby incorporated by reference in their entireties.

TECHNICAL FIELD

This application relates to the field of optical devices, and in particular, to a method for preparing a PN junction, a PN junction, and a modulator.

BACKGROUND

An optical modulator is an important device in an optical communication system, and is configured to convert an electrical signal into an optical signal. Typical optical modulators are Mach-Zehnder modulators, microring modulators, and the like. A PN junction is a key component of the optical modulator, and is formed by preparing a P-type doped region and an N-type doped region on an optical waveguide. A carrier-depletion region is formed at a boundary between the P-type doped region and the N-type doped region. When a value of an applied reverse voltage changes, an optical refractive index of materials changes in the carrier-depletion region of the PN junction due to a plasma dispersion effect, so that an optical phase in the waveguide changes, playing a modulation role.

Performance of the modulator is closely related to performance of the PN junction. For example, a size of coincidence between the carrier-depletion region of the PN junction and an optical mode field of the light passing through the PN junction affects modulation efficiency of the modulator. For another example, a design of a structure of the PN junction affects a degree of an optical loss of the modulator.

At present, designing the PN junction and the modulator with high modulation efficiency and a low optical loss is an important research topic.

SUMMARY

This application provides a method for preparing a PN junction, a PN junction, and a modulator, to implement a PN junction and a modulator with high modulation efficiency and a low optical loss.

According to a first aspect, an embodiment of this application provides a method for preparing a PN junction. The method includes three steps. In a first step, an optical waveguide is etched in a first direction by using a group of first masks as a barrier, to form a grating waveguide structure on a surface of the optical waveguide. The group of first masks are a plurality of masks arranged at intervals, the grating waveguide structure includes a plurality of waveguide blocks arranged at intervals, and a thickness of the grating waveguide structure is less than a thickness of the optical waveguide. In a second step, P-type ions are implanted into the optical waveguide in a first implantation direction by continuing to use the group of first masks as a barrier. An included angle between the first implantation direction and the first direction is in (10, 80) degrees, an included angle between the first implantation direction and an arrangement direction of the plurality of masks is in (0, 90) or (90, 180) degrees, an included angle between the first implantation direction and a second direction is in (0, 90) or (90, 180) degrees, and the second direction is perpendicular to both the arrangement direction of the plurality of masks and the first direction. In a third step, N-type ions are implanted into the optical waveguide in a second implantation direction by continuing to use the group of first masks as a barrier, to form a carrier-depletion region of the PN junction at a boundary between a region in which the P-type ions are located and a region in which the N-type ions are located. An included angle between the second implantation direction and the first direction is in (10, 80) degrees, an included angle between the second implantation direction and the arrangement direction of the plurality of masks is in (90, 180) or (0, 90), and an included angle between the second implantation direction and the second direction is in (90, 180) or (0, 90).

It should be noted that in the included angle between the first implantation direction and the arrangement direction of the plurality of masks, and the included angle between the second implantation direction and the arrangement direction of the plurality of masks, one is an acute angle, and the other is an obtuse angle. The same is true for the included angle between the first implantation direction and the second direction and the included angle between the second implantation direction and the second direction.

It should be understood that a sequence of the second step and the third step is not limited in this application. The PN junction is produced through ion-implantation doping at an inclined angle and masking once. A process is simple and a yield of the PN junction is high. In addition, the PN junction using the grating-shape waveguide structure has high modulation efficiency and a low optical loss.

Optionally, before the P-type ions are implanted into the optical waveguide in the first implantation direction, another mask is provided on the region in which the N-type ions are located. Optionally, before the N-type ions are implanted into the optical waveguide in the second implantation direction, a third mask is provided on the region in which the P-type ions are located. These optional implementations can prevent ions from being doped into a non-target waveguide region, and can further improve the yield of the produced PN junction.

Optionally, an included angle between the second implantation direction and the first implantation direction along an axisymmetric direction of the first direction is less than 10 degrees. By doing so, a volume of the waveguide occupied by the carrier-depletion region can be increased, and modulation efficiency of the produced PN junction can be further improved.

In a specific implementation, selection of an implantation angle depends on heights, widths, spacings, and the like of the plurality of waveguides arranged at intervals. For example, the included angle between the first implantation direction and the first direction may be 45 degrees, and the included angle between the second implantation direction and the first direction may be 45 degrees.

According to a second aspect, an embodiment of this application provides a PN junction. The PN junction includes a slab waveguide layer and a grating-shape waveguide layer provided on the slab waveguide layer. The grating-shape waveguide layer includes a plurality of waveguide blocks arranged at intervals along the first direction. The slab waveguide layer includes a first P-type doped region and a first N-type doped region. The first P-type doped region includes a plurality of first protruding regions, and the first N-type doped region includes a plurality of second protruding regions. The first protruding regions and the second protruding regions are alternately arranged along the first direction. A first carrier-depletion region is formed at a boundary between the first P-type doped region and the first N-type doped region, and the first carrier-depletion region is in a shape of S connected end to end along the first direction. Each of the waveguide blocks includes a second P-type doped region and a second N-type doped region. One second carrier-depletion region is formed at a boundary between each pair of the second P-type doped region and the second N-type doped region. A projection of each second P-type doped region on an upper surface of the slab waveguide layer coincides with a projection of the first P-type doped region on the upper surface of the slab waveguide layer. A projection of each second N-type doped region on the upper surface of the slab waveguide layer coincides with a projection of the first N-type doped region on the upper surface of the slab waveguide layer. Projections of the plurality of second carrier-depletion regions on the upper surface of the slab waveguide layer coincide with a projection of the first carrier-depletion region on the upper surface of the slab waveguide layer. It should be understood that coincidence between a projection A and a projection B described in this application means that the projection A basically falls within the projection B.

Optionally, a sum of a spacing between two adjacent waveguides in the plurality of waveguide blocks and a width of any one of the waveguide blocks along the first direction is less than 500 nanometers. By doing so, a wavelength range to which the PN junction is applicable can be improved.

Optionally, the width of the waveguide block along the first direction is less than 250 nanometers. By doing so, a proportion of an ineffective region in the PN junction can be reduced, and the optical loss of the PN junction can be well reduced.

Specifically, a material of the first waveguide region and/or the second waveguide region includes silicon or a group III-V material.

In a specific implementation, each of the plurality of second carrier-depletion regions is S-shaped. By doing so, a large coincidence degree of a carrier-depletion region and an optical mode field can be ensured, and the modulation efficiency of the PN junction can be improved.

In a specific implementation, the first carrier-depletion region and the plurality of second carrier-depletion regions are implemented by ion-implantation doping at an inclined angle. By using the method, producing complexity can be reduced and costs can be reduced.

It should be understood that the first direction may be a straight line or a ring. To be specific, the plurality of waveguide blocks are arranged at intervals in a straight line or arranged at intervals in a ring shape.

According to a third aspect, an embodiment of this application provides a Mach-Zehnder modulator. The modulator includes a plurality of waveguides, two PN junctions according to the second aspect or any specific or optional implementation of the second aspect, two couplers, and electrodes. Two ends of each of the two PN junctions are respectively connected to the two couplers through the plurality of waveguides, respectively. One of the two couplers includes an input end of the modulator, and the other of the two couplers includes an output end of the modulator.

The electrodes are configured to apply voltages to the two PN junction to change phases of light inputted to the two PN junctions.

In a specific implementation, a quantity of the electrodes is two, and the two electrodes are configured to be connected to a negative drive signal and a positive drive signal, respectively. In another implementation, a quantity of the electrodes is five, and the five electrodes are configured to be grounded, be connected to a negative drive signal, be grounded, be connected to a positive drive signal, and be grounded, respectively.

According to a fourth aspect, an embodiment of this application discloses a microring modulator. The microring modulator includes the PN junction according to the second aspect or any specific or optional implementation of the second aspect and two straight waveguides. The plurality of waveguide blocks of the PN junction are arranged at intervals in a ring shape. The two straight waveguides are respectively located on two sides of the PN junction, and the two straight waveguides are basically parallel to each other.

In conclusion, according to the PN junction or the method for preparing a PN junction provided in this application, a structure in which waveguides arranged at intervals is provided on a slab waveguide layer is implemented, and a low optical loss is achieved. In addition, the PN junction provides a carrier-depletion region similar to an S shape, and provides high modulation efficiency.

BRIEF DESCRIPTION OF THE DRAWINGS

Features, advantages, and other aspects of implementations of this application become clearer with reference to following detailed descriptions and accompanying drawings. Several implementations of the present disclosure are shown herein through examples but not in a limitative manner in the accompanying drawings.

DETAILED DESCRIPTION OF ILLUSTRATIVE EMBODIMENTS

Figure 1:
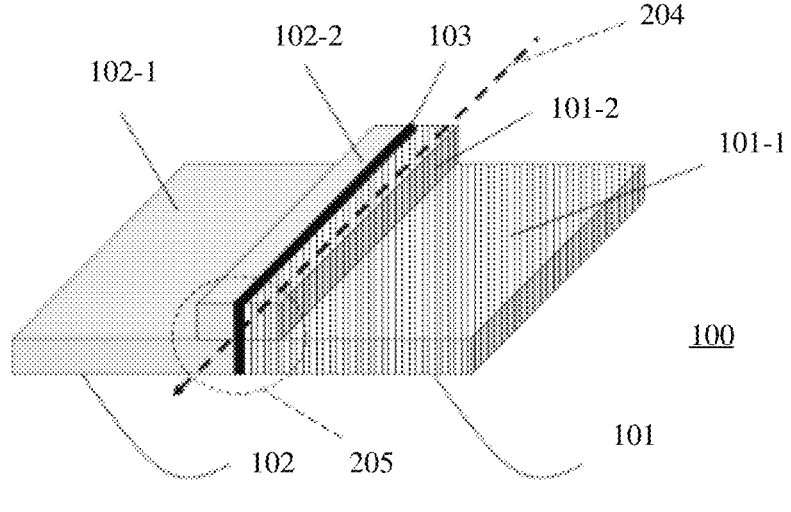
FIG. 1 is a schematic diagram of a structure of a PN junction.

A device form and a service scenario described in embodiments of this application are intended to describe technical solutions in embodiments of the present invention more clearly, and do not constitute a limitation on the technical solutions provided in embodiments of the present invention. A person of ordinary skill in the art may know that with evolution of the device form and emergence of a new service scenario, the technical solutions provided in embodiments of this application are also applicable to a similar technical problem.

The technical solutions provided in this application are applicable to a scenario in which data communication is performed by using an optical signal, for example, a router network, a telecom Ethernet network, an optical access network, or a data center network. Specifically, the technical solutions provided in this application may be used for a sending side device corresponding to any one of the foregoing networks.

It should be noted that the terms "first", "second", and the like in this application are used for distinguishing between similar objects, but are not necessarily used for describing a specific order or sequence. It should be understood that ordinal numbers used in this way may be exchanged in an appropriate case, so that the embodiments described herein can be implemented in an order not described in this application. The term "and/or" is used for describing an association relationship between associated objects, and indicates that three relationships may exist. For example, A and/or B may represent: only A exists, both A and B exist, and only B exists. Unless otherwise specified, same or similar technical descriptions provided in a preparation method embodiment may also be applied to an apparatus embodiment; and vice versa.

It should be understood that a quantity of masks and a quantity of waveguide blocks included in a grating waveguide in the accompanying drawings of this application are only examples. An actual design may be implemented based on a specific requirement. This is not limited in this application.

Unless otherwise specified, specific descriptions of some technical features in one embodiment may also be used to explain corresponding technical features mentioned in another embodiment, for example, an example of a material of a waveguide. For another example, a function or name of a carrier-depletion region or a relationship between carrier-depletion regions in different regions. In addition, to more clearly reflect a relationship between components in different embodiments, in this application, same or similar drawing numbers are used to indicate components with same or similar functions in the different embodiments. It should be understood that two types of ions in this application may be replaced with each other. Specifically, a region doped with P-type ions may be replaced by being doped with N-type ions. Correspondingly, a region doped with the N-type ions may be replaced by being doped with the P-type ions.

An optical modulator is an important device in an optical communication system, and is configured to convert an electrical signal into an optical signal. A PN junction is an important component of the optical modulator. FIG. 1 is a schematic diagram of a structure of a PN junction. As shown in FIG. 1, the PN junction 100 includes a P-type doped region 102, an N-type doped region 101, and a carrier-depletion region 103. The P-type doped region 102 includes a slab waveguide region 102-1 and a ridge waveguide region 102-2. Similarly, the N-type doped region 101 includes a slab waveguide region 101-1 and a ridge waveguide region 101-2. It should be understood that the slab waveguide region 102-1 and the slab waveguide region 101-1 may also be referred to as a slab waveguide region of the PN junction 100, and the ridge waveguide region 102-2 and the waveguide region 101-2 may also be referred to as a ridge waveguide region of the PN junction.

FIG. 1 provides a schematic diagram (reference numeral 204) of a propagation direction of light along a waveguide and a schematic diagram (reference numeral 205) of an optical mode field. It should be understood that the optical mode field refers to an electric field distribution of the light stably transmitted in the waveguide. As the light transmits in the PN junction 100 in the direction 204, a phase of the light changes due to different voltage values applied to the PN junction 100, to implement modulation of the light. Modulation efficiency and an optical loss are two important performance parameters of the PN junction. The modulation efficiency of the PN junction is related to a size of coincidence between the carrier-depletion region and the optical mode field. Generally, a higher degree of the coincidence between the carrier-depletion region and the optical mode field indicates a larger range of a modulation phase of the PN junction and higher modulation efficiency. For the PN junction 100 shown in FIG. 1, along the propagation direction 204 of the light, the coincidence between the carrier-depletion region 103 and the optical mode field 205 is small (equal to a cross-sectional size of the carrier-depletion region). Therefore, the modulation efficiency of the PN junction shown in FIG. 1 is low. The optical loss refers to a degree to which transmission power of the light in the PN junction is reduced. As shown in FIG. 1, in a process of light propagation, in addition to passing through the carrier-depletion region 103 that performs a modulation function, the light further passes through a part of the P-type doped region and a part of the N-type doped region, and the power of the light is reduced, in other words, the optical loss is large.

Therefore, this application provides a new method for preparing a PN junction, a PN junction, and a modulator. By using the grating waveguides arranged at intervals, according to the method for preparing a PN junction and the PN junction provided in this application, the modulation efficiency of the PN junction can be effectively improved and the optical loss can be reduced. Correspondingly, using the modulator of the PN junction disclosed in this application greatly improves the modulation efficiency and the loss.

Figure 2:
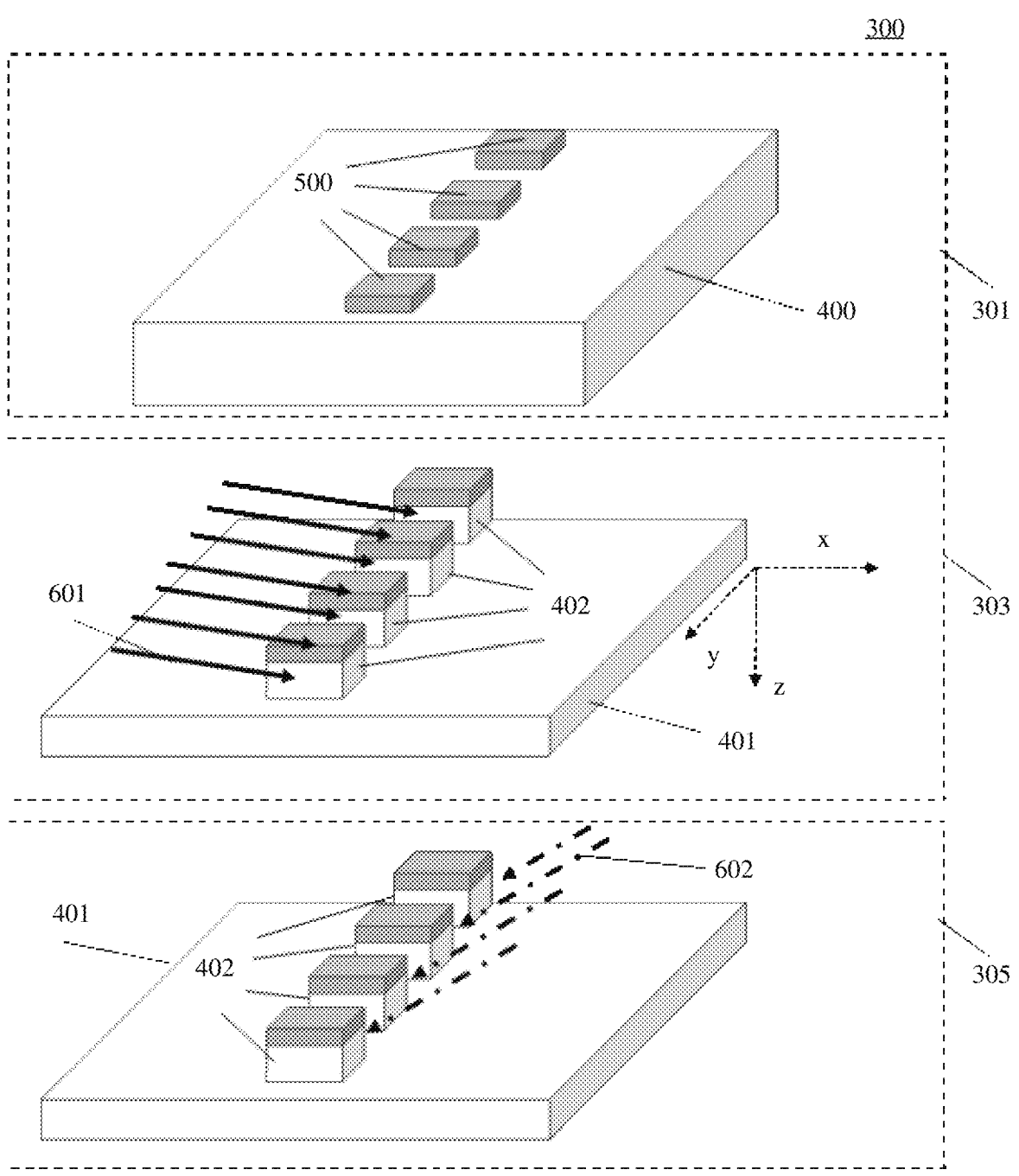
FIG. 2 is a schematic diagram of a method for preparing a PN junction according to an embodiment of this application.

FIG. 2 is a schematic diagram of a method for preparing a PN junction according to an embodiment of this application. As shown in FIG. 2, the method 300 for preparing a PN junction includes three steps (301, 303, and 305). It should be understood that a sequence of steps 303 and 305 is interchangeable.

Step 301: Etch an optical waveguide along a first direction by using a group of masks as a barrier, to form a grating waveguide structure on a surface of the optical waveguide.

Specifically, the first direction is a direction indicated by a z-axis arrow shown in FIG. 2. The group of masks 500 is a plurality of masks arranged at intervals. Specifically, the plurality of masks are arranged at intervals along a direction indicated by a y axis arrow shown in FIG. 2. Correspondingly, after the etching of the optical waveguide along the first direction is completed, a slab waveguide layer 401 and a grating waveguide structure 402 that is not etched because of blocking of the masks are formed. It is similar to an arrangement of the masks that, the grating waveguide structure 402 includes a plurality of waveguide blocks arranged at intervals. A spacing of the waveguide blocks is determined by a spacing of the group of masks 500. As shown in FIG. 2, a thickness of the grating waveguide structure 402 is less than a thickness of an optical waveguide 400. It should be understood that, after the step 301, the optical waveguide 400 includes the slab waveguide layer 401 and the plurality of waveguide blocks (namely, the grating waveguide structure) 402 arranged at intervals. For simplified description in the following, the optical waveguide 400 after the step 301 is referred to as the etched optical waveguide 400 for short. A waveguide material includes, but is not limited to, a group III-V material such as silicon, gallium arsenide, or indium phosphide.

It should be noted that the grating waveguide may also be referred to as a grating-shape waveguide, and in this application, refers to a group of waveguide blocks arranged at intervals along a predetermined direction.

Step 303: Implant P-type ions into the etched optical waveguide 400 in a first implantation direction 601 by continuing to use the group of masks 500 as a barrier. An included angle between the first implantation direction 601 and the first direction (for example, a z-axis direction shown in FIG. 2) is in (0, 90) degrees, an included angle between the first implantation direction 601 and an arrangement direction of the plurality of waveguide blocks is in (0, 90) degrees or (90, 180) degrees, and an included angle between the first implantation direction 601 and the second direction is in (0, 90) degrees or (90,180) degrees. The second direction is a direction perpendicular to both the first direction and the arrangement direction of the plurality of waveguide blocks.

For example, as shown in FIG. 2, the second direction, the arrangement direction of the plurality of waveguide blocks, and the first direction are respectively represented by three axes x, y, and z. In this embodiment, the x, y, and z axes are perpendicular to each other, and directions are respectively a horizontal direction to the right, a light propagation direction, and an etching direction (namely, the first direction). It should be understood that this direction schematic diagram is only used to describe a relative position relationship between the first implantation direction 601 and the etched optical waveguide 400, and does not limit the method for preparing a PN junction or the PN junction using the preparation method. For example, the light propagation direction may be an opposite direction along the y axis.

Figure 3:
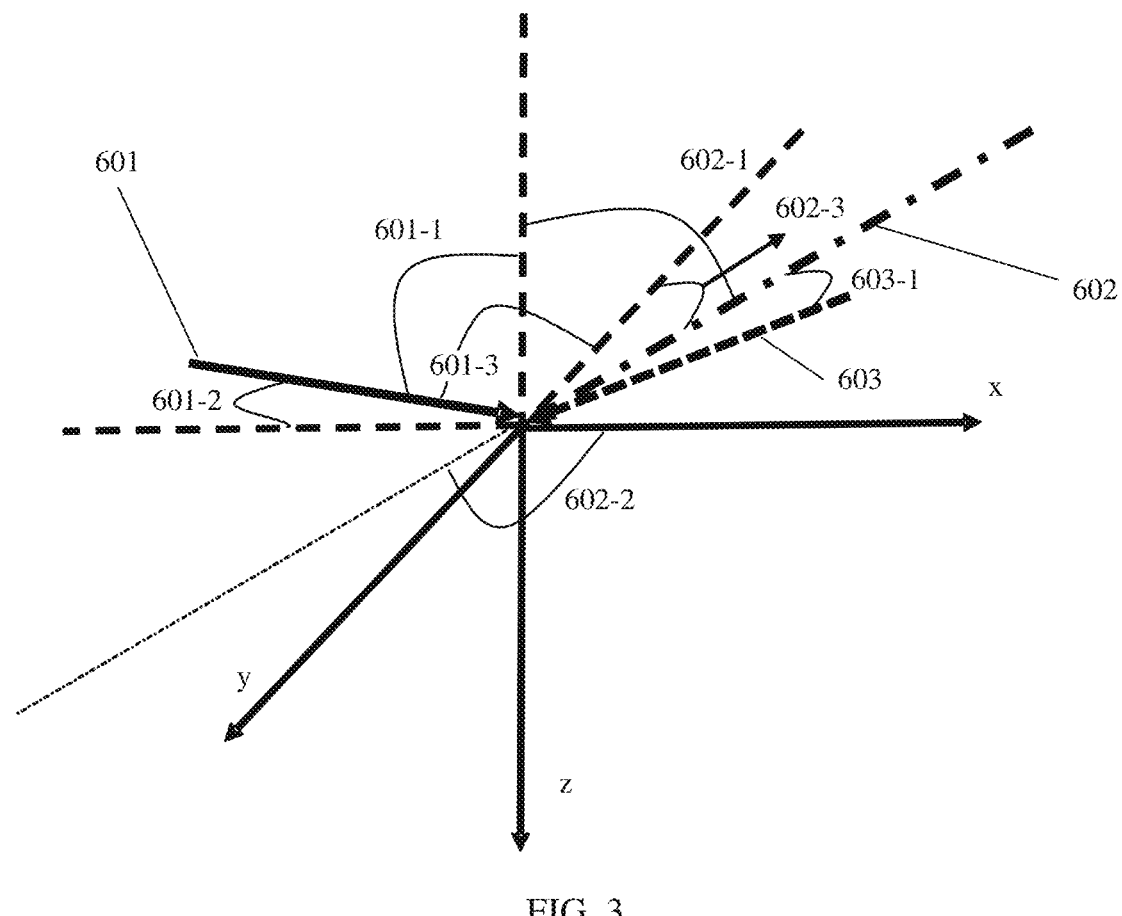
FIG. 3 is a schematic diagram of ion implantation directions shown in FIG. 2.

FIG. 3 is a schematic diagram of ion implantation directions shown in FIG. 2. As shown in FIG. 3, an included angle between the implantation direction 601 and each of the three axes is separately formed. It should be noted that the included angle mentioned in this application refers to an angle formed between two straight lines (vectors) with directions. Specifically, an included angle 601-1 between implantation direction 601 and the z axis is formed, an included angle 601-3 between the implantation direction 601 and the y axis is formed, and an included angle 601-2 between the implantation direction 601 and the x axis is formed. In this embodiment, the first implantation direction 601 needs to meet the following conditions, to implement P-type ion implantation at an inclined angle. The included angle 601-1 is in (0, 90) degrees, and the included angles 601-3 and 601-2 are in (0, 90) degrees or (90, 180) degrees. It should be understood that FIG. 3 shows an example in which the included angle 601-3 is in (90, 180) degrees, and the included angle 601-2 is in (0, 90) degrees. An angle used during specific preparation is not limited in this application, provided that the foregoing conditions of the implantation at the inclined angle are met.

Generally, the included angle 601-1 is in (10, 80) degrees to form a carrier-depletion region with a large coincidence region with a light field after all the preparation steps are completed. For example, the included angle 601-1 is 45 degrees to form a PN junction with high modulation efficiency. It should be understood that selection of an angle of the first implantation direction depends on a spacing, a height, a width, and/or a thickness of a mask of the waveguide blocks.

Step 305: Implant N-type ions into the etched optical waveguide 400 in a second implantation direction 602 by continuing to use the group of masks 500 as a barrier, to form a carrier-depletion region of the PN junction at a boundary between a region in which the P-type ions are located and a region in which the N-type ions are located. An included angle between the second implantation direction 602 and the first direction (the z direction shown in FIG. 2) is in (0, 90) degrees, an included angle between the second implantation direction 602 and the arrangement direction of the plurality of waveguide blocks is in (90, 180) or (0, 90) degrees, and an included angle between the first implantation direction 602 and the second direction (the x direction shown in FIG. 2) is in (90, 180) or (0, 90) degrees.

FIG. 3 is used as an example to describe a relationship between the second implantation direction 602 and the first implantation direction 601. As shown in FIG. 3, an included angle between the implantation direction 602 and each of the three axes is formed. Specifically, an included angle 602-1 between the implantation direction 602 and the z axis is formed, an included angle 602-3 between the implantation direction 602 and the y axis is formed, and an included angle 602-2 between the implantation direction 602 and the x axis is formed. In this embodiment, the first implantation direction 602 needs to meet the following conditions, to implement N-type ion implantation at an inclined angle. The included angle 602-1 is in (0, 90) degrees, and the included angles 602-3 and 602-2 are in (90, 180) degrees or (0, 90) degrees. It should be understood that FIG. 3 shows an example in which the included angle 602-3 is in (0, 90) degrees, and the included angle 602-2 is in (90, 180) degrees. An angle used during specific preparation is not limited in this application, provided that the foregoing conditions of the implantation at the inclined angle are met.

It should be noted that the included angle between the second implantation direction 602 and the x axis and the included angle between the first implantation direction 601 and the x axis in this example are respectively in (90, 180) degrees and (0, 90) degrees. In another example, values of the included angle between the second implantation direction 602 and the x axis and the included angle between the first implantation direction 601 and the x axis may be reversed, that is, may be respectively in (0, 90) degrees and (90, 180) degrees. In other words, the two included angles have a relationship that one is an acute angle and the other is an obtuse angle. The included angle between the second implantation direction 602 and the y axis and the included angle between the first implantation direction 601 and the y axis also have a similar relationship. Details are not described herein again.

Generally, similar to the included angle 601-1, the included angle 602-1 is in (10, 80) degrees to form a carrier-depletion region with a large coincidence region with the light field after all the preparation steps are completed.

For example, the included angle 602-1 is 45 degrees to form a PN junction with high modulation efficiency. It should also be noted that, to form a carrier-depletion region with high performance, the second implantation direction 602 and the first implantation direction 601 have a particular relationship. To be specific, the included angle between the second implantation direction 602 and the first implantation direction 601 along an axisymmetric direction of the first direction is less than 10 degrees. An advantage of doing so is that a carrier-depletion region of a PN junction with a high degree of coincidence with the optical field can be formed, to obtain high modulation efficiency. As shown in FIG. 3, the direction 603 is an axisymmetric direction of the first implantation direction 601 along the z direction. The included angle between the second implantation direction 602 and the first implantation direction 601 along the axisymmetric direction of the first direction is less than 10 degrees, which may be understood as that the included angle 603-1 between the second implantation direction 602 and the direction 603 is less than 10 degrees, for example, 5 degrees. For another example, the second implantation direction 602 and the first implantation direction 601 are in an axisymmetric relationship.

It should also be noted that the carrier-depletion region may also be referred to as an effective modulation region, a PN junction barrier region, a PN junction barrier layer, or the like. This is not limited in embodiments of this application.

Figure 4:
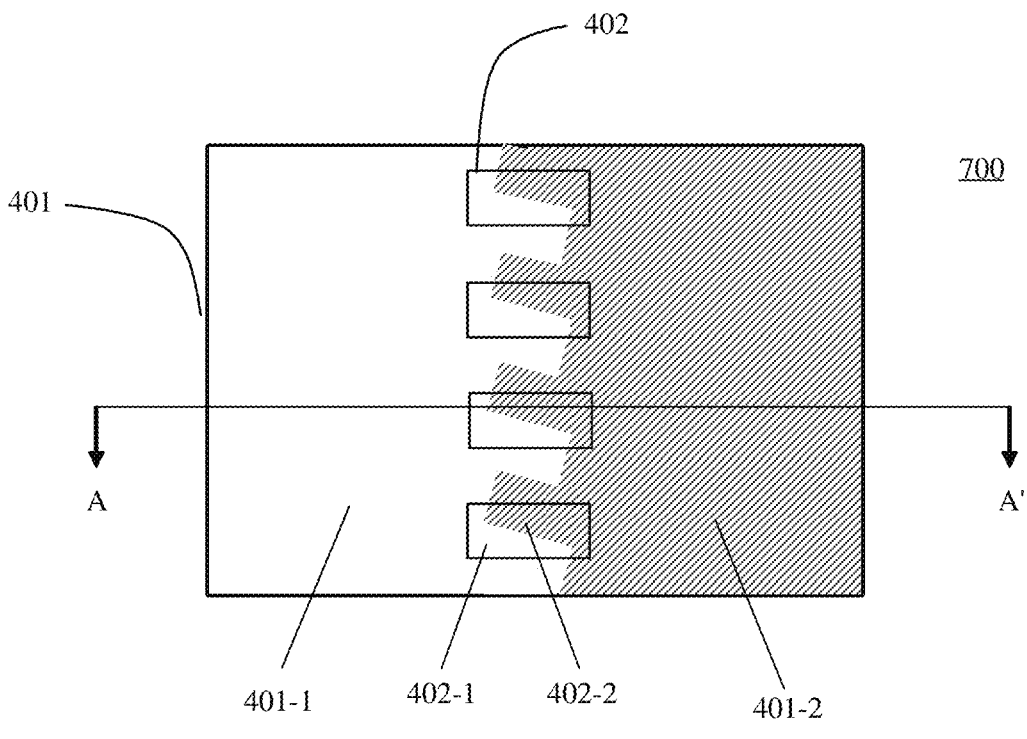
FIG. 4 is a top view of a possible PN junction according to an embodiment of this application.

After the foregoing three preparation steps, a PN junction with high modulation efficiency and a low optical loss can be obtained. The PN junction going through the steps of preparation shown in FIG. 2 is described below with reference to more examples of the accompanying drawings. FIG. 4 is a top view of a possible PN junction according to an embodiment of this application. Specifically, the PN junction 700 includes a slab waveguide layer 401, a grating waveguide structure 402, and a carrier-depletion region (not shown in the figure). A plurality of waveguides in the grating waveguide structure 402 are arranged at intervals, and this reduces an optical loss caused when light passes through the PN junction, and improves corresponding performance of the PN junction. The slab waveguide layer 401 includes a P-type doped region 401-1 and an N-type doped region 401-2. Similarly, each of the plurality of waveguides included in the grating waveguide structure 402 also includes a P-type doped region and an N-type doped region, respectively indicated by reference numerals 402-1 and 402-2 in FIG. 4. It should be understood that the P-type doped region may also be referred to as a P region, a P-ion doped region, a P-type ion region, a region in which P-type ions are located, or the like. This name is not limited in this application. Similarly, the N-type doped region may also be referred to as an N region, an N-ion doped region, an N-type ion region, a region in which N-type ions are located, or the like. It should be noted that in the slab waveguide layer, each of the P region and the N region has a plurality of protruding regions, and the protruding regions are alternately arranged along an arrangement direction of the plurality of waveguides included in the grating waveguide structure 402. Within the grating waveguide structure 402, a distribution of the P region and the N region is similar to a distribution of the P region and the N region of the slab layer. It should be noted that the carrier-depletion region (not shown in FIG. 4) is located at a boundary between the P region and the N region. As shown in the top view of the example in FIG. 4, a distribution of the carrier-depletion region in the slab waveguide layer is similar to a shape of S connected end to end; and a distribution of the carrier-depletion region in each waveguide of the grating waveguide structure 402 is similar to an S shape. It should be noted that a cross-sectional shape of the carrier-depletion region in the slab waveguide layer on any plane parallel to the x axis and they axis is similar to that of the top view shown in FIG. 4. Similarly, the cross-sectional shape of the carrier-depletion region in the grating waveguide structure on planes parallel to the x axis and the y axis is similar to that of the top view shown in FIG. 4. It should be understood that FIG. 4 is only a schematic diagram, and another deformation similar to an S shape is also within the scope of this application. In addition, FIG. 8 and FIG. 9 in this application further provide other possible examples. Refer to related accompanying drawings and descriptions. Details are not described herein again.

Figure 5:
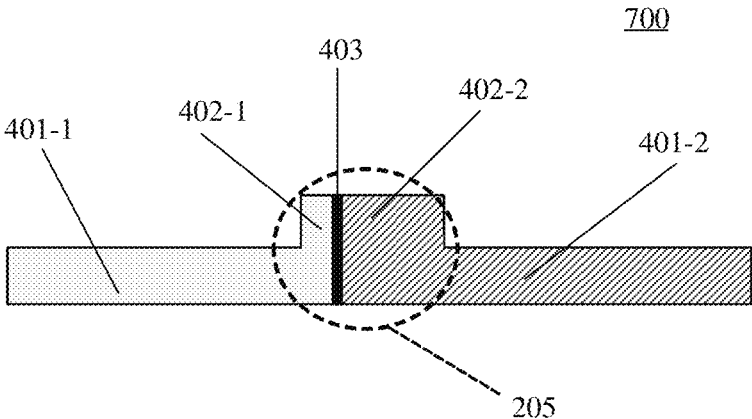
FIG. 5 is a cross-sectional view of the PN junction shown in FIG. 4.
Figure 6:
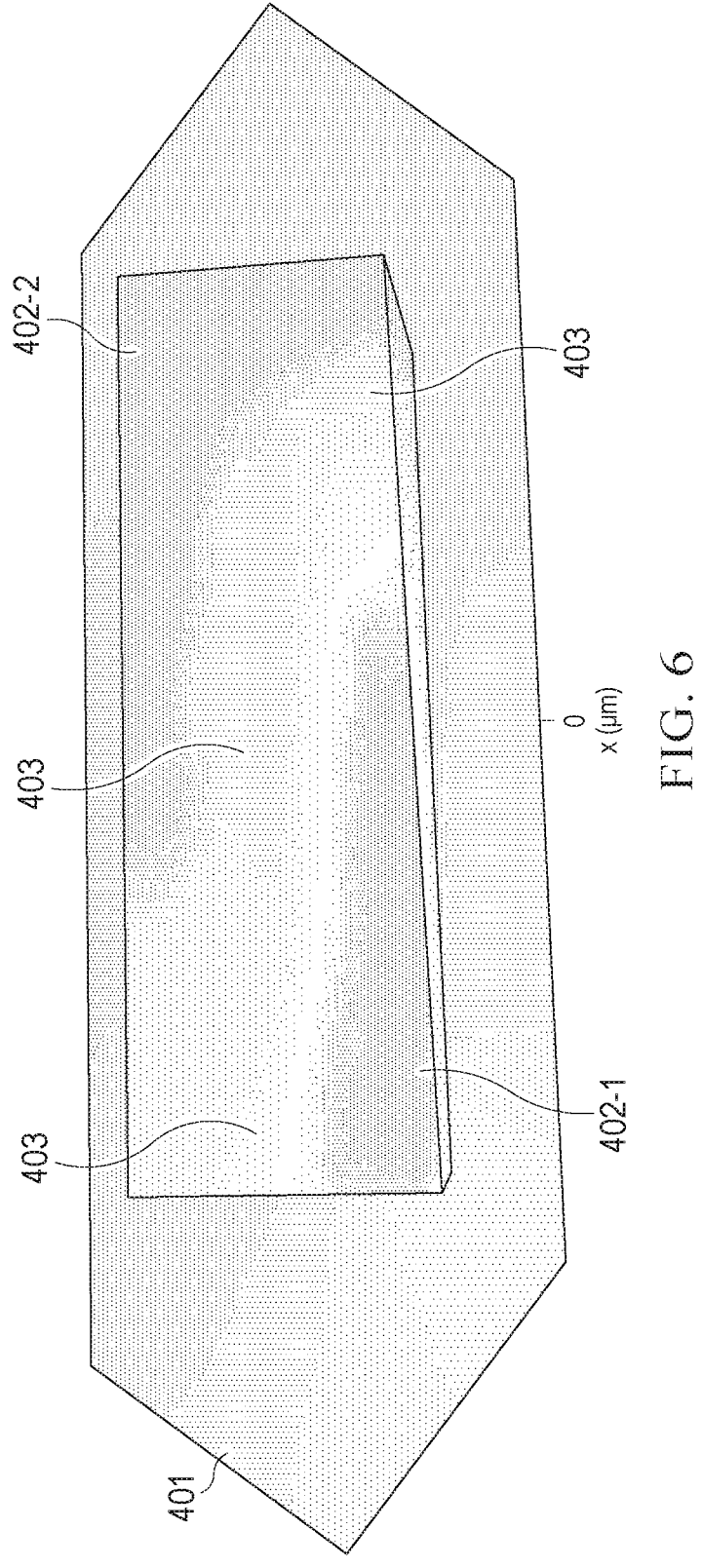
FIG. 6 is a schematic diagram of possible simulation performance of a PN junction according to this application.

FIG. 5 is a schematic diagram of a cross-section of the PN junction shown in FIG. 4. To describe performance of the PN junction, FIG. 5 shows a schematic diagram of a light field distribution (205). Specifically, FIG. 5 is a schematic diagram of a cross-section of a PN junction 700 obtained along A-A' shown in FIG. 4. As shown in FIG. 5, the PN junction 700 includes the slab waveguide layer 401 (401-1 and 401-2), the grating waveguide structure 402 (402-1 and 402-2), and a carrier-depletion region 403. For descriptions of the slab waveguide layer 401 and the grating waveguide structure 402, refer to FIG. 2 to FIG. 4. Details are not described herein again. FIG. 6 is a schematic diagram of possible simulation performance of a PN junction according to this application. FIG. 6 is a schematic diagram of partial simulation of the PN junction, including a part of a slab waveguide layer 401, one waveguide of a plurality of waveguides of the grating waveguide structure 402, and a carrier-depletion region 403 of the waveguide. As shown in FIG. 6, the carrier-depletion region 403 occupies more than 50% of the waveguide, in other words, an effective region (modulation region) of the waveguide is large. In addition, an ineffective region (namely, a non-carrier-depletion region) is small along a direction of a light field.

With reference to the top view of the carrier-depletion region in FIG. 4, the cross-sectional view in FIG. 5, and the diagram of the simulation performance in FIG. 6, it can be learned that, a coincidence area between a projection of the carrier-depletion region shown in FIG. 4 on an interface shown in FIG. 5 and the light field is large. Modulation efficiency of the PN junction can be well improved.

It should be understood that the modulation efficiency depends not only on a degree of coincidence between the carrier-depletion region and the light field in the cross section shown in FIG. 5, but also on a degree of coincidence between the carrier-depletion region and the light field in the propagation direction of the light. With reference to FIG. 4 and FIG. 5, it can be learned that a PN junction produced by using the method for preparing a PN junction shown in FIG. 2 also has a high degree of coincidence with an optical mode field in the propagation direction of the light. In addition, the ineffective region of the PN junction is small and the optical loss of the PN junction is low.

In conclusion, a PN junction with a low optical loss and high modulation efficiency can be produced by using the method for preparing a PN junction shown in FIG. 2. In addition, in comparison with optical waveguide etching and ion doping separately performed through a plurality of times of different masking, in the embodiment shown in FIG. 2, masking is performed only once to simultaneously complete the optical waveguide etching and doping, which has a simple process and low implementation difficulty, and is beneficial to reduce preparation costs of the PN junction. An alignment error is introduced by performing masking for a plurality of times. As a result, positions of the P region and the N region are shifted, affecting the modulation efficiency of the PN junction. Through simulation, it is discovered that the modulation efficiency of PN junction may be reduced by 40% or more, and this greatly affects a processing yield of the PN junction (to be specific, a proportion of the produced PN junction that meets expected performance, also referred to as a yield rate). The method for preparing a PN junction shown in FIG. 2 performs masking only once, to avoid introduction of an alignment error. In this way, the yield rate is effectively improved and the preparation costs of the PN junction can be reduced.

Figure 7:
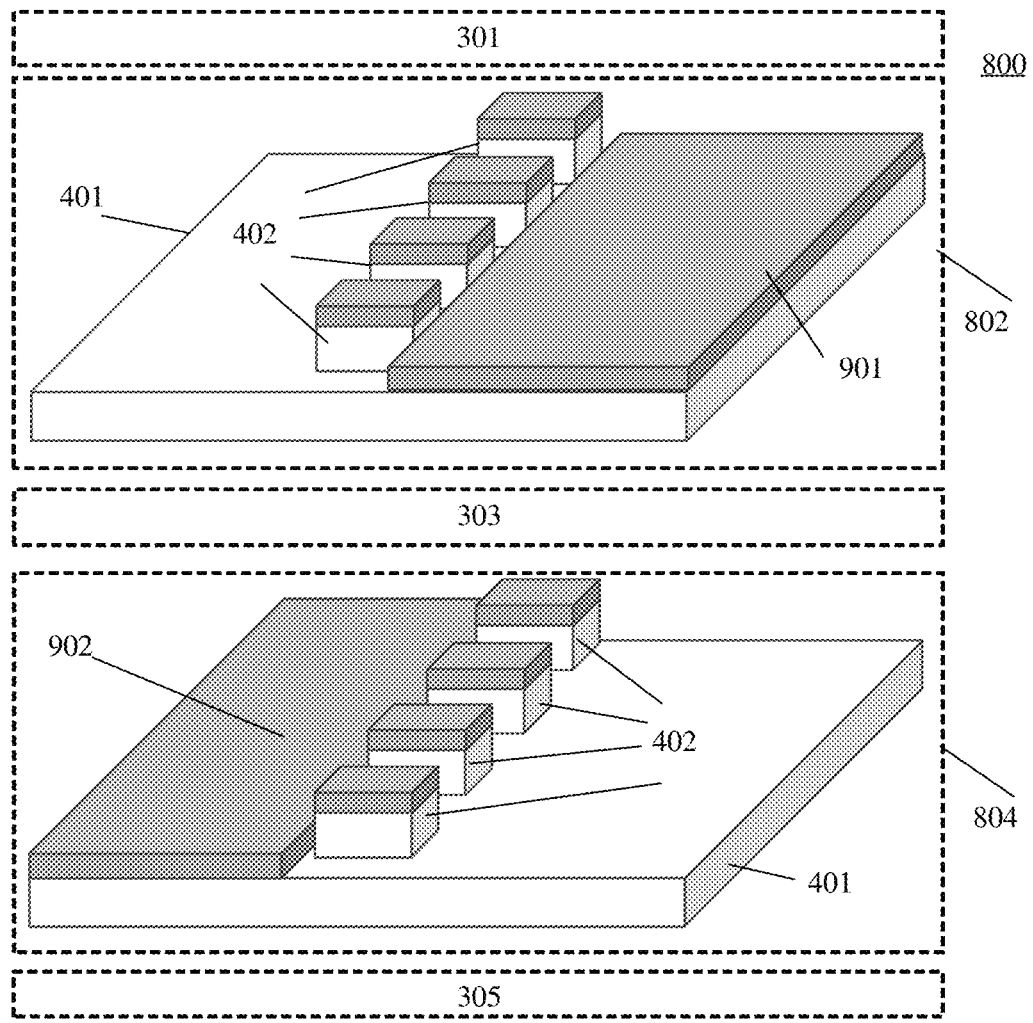
FIG. 7 is a schematic diagram of another method for preparing a PN junction according to an embodiment of this application.

FIG. 7 is a schematic diagram of another method for preparing a PN junction according to an embodiment of this application. As shown in FIG. 7, the preparation method 800 includes five steps, namely, steps 301, 802, 303, 804, and 305. Steps 301, 303, and 305 are basically the same as the three steps in FIG. 2. For details, refer to related descriptions in FIG. 2. Details are not described herein again. In step 802, before P-type ion doping is performed on the etched optical waveguide 400, a mask 901 is placed above the N-type ion-doped region 401-2 shown in FIG. 5. Similarly, in step 805, before N-type ion doping is performed on the etched optical waveguide 400, a mask 902 is placed above the P-type ion-doped region 401-1 shown in FIG. 5. An advantage of placing the two masks (901 and 902) is that ion doping into a non-corresponding doped region can be reduced during the ion doping. For example, the mask 901 can prevent P-type ions from being doped into the N-type doped region 401-2. Correspondingly, the mask 902 can prevent N-type ions from being doped into the P-type doped region 401-1. By doing so, the yield rate of the PN junction can be further improved and the producing costs can be further reduced.

Beneficial effects brought by the method for preparing a PN junction shown in FIG. 7 are the same as those brought by the method for preparing a PN junction shown in FIG. 2, in other words, modulation efficiency and optical loss performance of the produced PN junction are also well improved. Details are not described herein again. In addition, the production method shown in FIG. 7 can further improve the yield rate of the PN junction.

Figure 8:
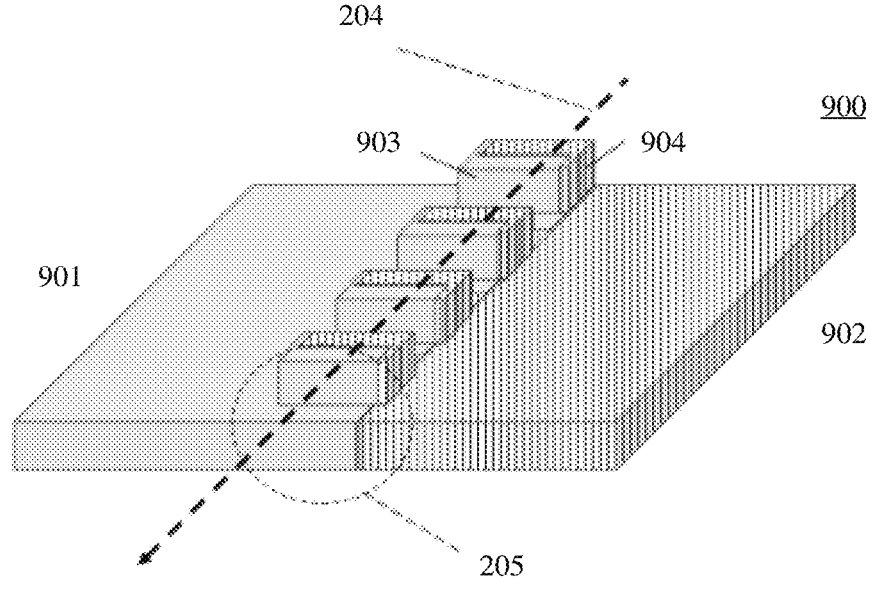
FIG. 8 is a schematic diagram of another possible PN junction according to an embodiment of this application.

FIG. 8 is a diagram of a structure of another possible PN junction according to an embodiment of this application. As shown in FIG. 8, the PN junction 900 includes a P-type doped region 901 of a slab waveguide layer, an N-type doped region 902 of the slab waveguide layer, a P-type doped region 903 of a grating waveguide layer, an N-type doped region 904 of the grating waveguide layer, and a carrier-depletion region (not shown in the figure). Specifically, the PN junction 900 is a two-layer structure, and the structure shown in FIG. 8 is implemented by using an existing preparation process or the method for preparing a PN junction shown in FIG. 2 or FIG. 7. The grating waveguide layer includes a plurality of waveguides arranged along a light propagation direction. A carrier-depletion region is at a boundary between the P-type doped region and the N-type doped region. The carrier-depletion region is further described below with reference to FIG. 9 to FIG. 11.

Figure 9:
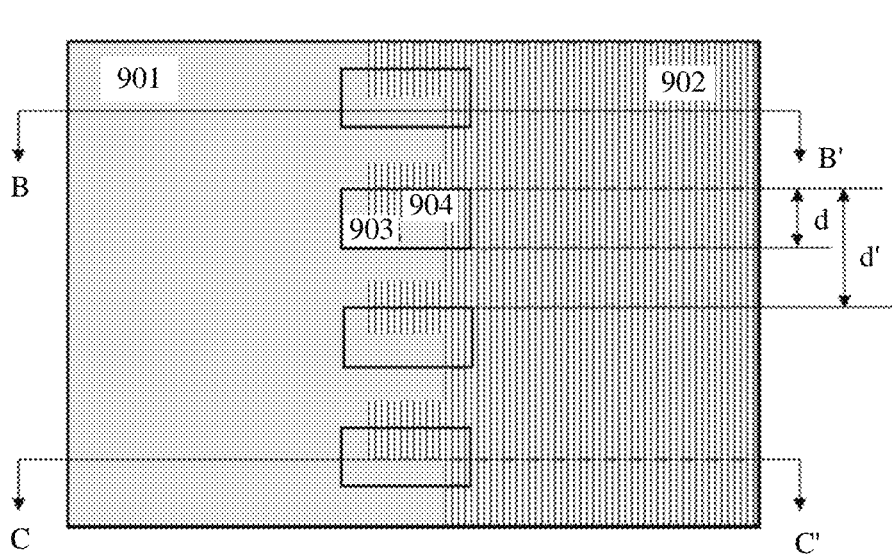
FIG. 9 is a top view of the PN junction shown in FIG. 8.

FIG. 9 is a top view of the PN junction shown in FIG. 8. As shown in FIG. 9, a projection of the P-type doped region 903 of the grating waveguide layer on a surface of the slab waveguide layer coincides with a projection of the P-type doped region 901 of the slab waveguide layer on the surface of the slab waveguide layer. It should be noted that in this application, coincidence means that in two projection areas on a same plane, a smaller area basically falls within a larger area. The coincidence may also be referred to as basic coincidence. It should be understood that a relationship between the two P-type doped regions (903 and 901) may also be described as: the projection of the P-type doped region 903 of the grating waveguide layer on the surface of the slab waveguide layer falls within the projection of the P-type doped region 901 of the slab waveguide layer on the surface of the slab waveguide layer. Similarly, the two N-type doped regions (904 and 902) have a similar relationship. Specifically, a projection of the N-type doped region 904 of the grating waveguide layer on the surface of the slab waveguide layer coincides with a projection of the N-type doped region 902 of the slab waveguide layer on the surface of the slab waveguide layer. Similarly, a projection of the carrier-depletion region formed at the grating waveguide layer on an upper surface of the slab waveguide layer coincides with a projection of the carrier-depletion region formed at the slab waveguide layer on the upper surface of the slab waveguide layer.

It should be noted that due to a limitation of the producing process, doped regions of a same type may not completely coincide, and a few non-coinciding regions may exist at an edge part. Similarly, carrier-depletion regions of upper and lower layers may not completely coincide, and there may be incompletely coinciding parts due to a doping process or another producing error. It should be understood that a case in which a few non-coinciding regions or incompletely coinciding parts exist also belongs to the coincidence relationship described in this application.

As shown in FIG. 9, d' is an example of a distance between two adjacent waveguides. In this example, d' is a sum of a width d of the waveguide along the light propagation direction and a size of a gap between the two adjacent waveguides, and is also referred to as a period. In general, the period d' needs to be less than a wavelength passing through the grating waveguide. Usually, the distance between the two adjacent waveguides in the grating waveguide layer is less than or equal to 1.6 micrometers (μm), for example, d' is less than 1.6 μm. In a possible implementation, the distance between two adjacent waveguides in the grating waveguide layer is less than 500 nanometers (nm). For example, d' is less than 500 nm. This design can cover a wide wavelength range and expand scenarios applicable to the PN junction. Usually, a width of a waveguide in the grating waveguide layer along a light propagation direction is less than or equal to 800 nm, in other words, d is less than or equal to 800 nm. In a possible implementation, d is half of d'. For example, d' is 500 nm, and d is 250 nm. This design can equalize a ratio of the carrier-depletion region and the gap between the two adjacent waveguides, to minimize an optical loss while ensuring modulation efficiency. It should be understood that the distance between the two adjacent waveguides may be measured in another manner, for example, measured by using a distance between central axes of the two waveguides or in another manner. This is not limited in this application.

As shown in FIG. 9, both the P-type doped region 901 and the N-type doped region 902 have protruding regions, and these protruding regions are alternately arranged along the light propagation direction. A boundary between the two doped regions is a carrier-depletion region (not shown in the figure). It is similar to FIG. 4 that, a distribution of the boundary shown in FIG. 9 may also be an S shape. Depending on the width of the waveguide blocks in the grating waveguide region along the light propagation direction, a distribution of the boundary may alternatively be a straight line or similar to a straight line. In comparison with the latter, the optical field in the carrier-depletion region with an S-shaped distribution form has a larger degree of coincidence, and the modulation efficiency may be relatively higher. However, in comparison with a conventional technology, the carrier-depletion regions with the two distribution forms are both improved in the modulation efficiency. It should be understood that FIG. 9 provides only a schematic diagram of a boundary area, and a form of the boundary area may alternatively be replaced with a form shown in FIG. 4.

Figure 10:
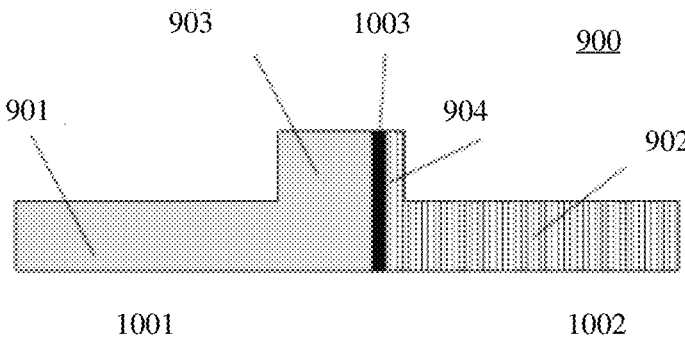
FIG. 10 is a first cross-sectional view of the PN junction shown in FIG. 9.
Figure 11:
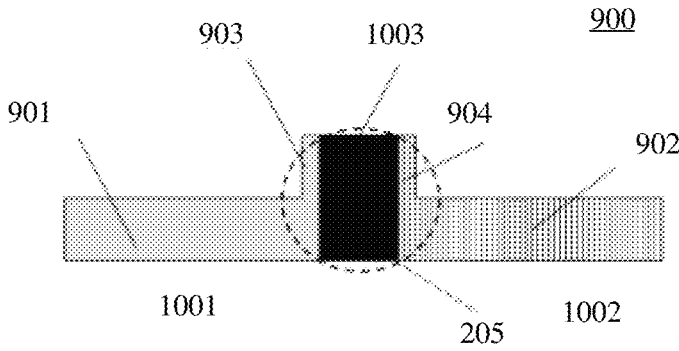
FIG. 11 is a second cross-sectional view of the PN junction shown in FIG. 9.

FIG. 10 is a first cross-sectional view of the PN junction shown in FIG. 9. FIG. 11 is a second cross-sectional view of the PN junction shown in FIG. 9. Specifically, FIG. 10 and FIG. 11 are cross-sectional views along B-B' and along C-C', respectively. For a part that already appears in FIG. 8 and FIG. 9, namely, 901 to 904, details are not described herein again. A P-type doped region 1001 includes a P-type doped region 901 of a slab waveguide layer and a P-type doped region 903 of a grating waveguide layer. An N-type doped region 1002 includes an N-type doped region 902 of the slab waveguide layer and a P-type doped region 904 of the grating waveguide layer. It should be understood that the P-type doped region 1001 and the N-type doped region 1002 are formed by performing ion doping on a waveguide. Division of the accompanying drawings in this application is only intended to describe different features of regions.

FIG. 10 and FIG. 11 are schematic diagrams of carrier-depletion regions at two different cross-sectional positions. A carrier-depletion region 1003 shown in FIG. 10 is closer to the N-type doped region, and a carrier-depletion region 1004 shown in FIG. 11 has a largest cross-sectional area. It can be learned from FIG. 9 to FIG. 11 that a degree of coincidence between the carrier-depletion region and the optical mode field along the light propagation direction is high. Therefore, modulation efficiency of the PN junction shown in FIG. 9 is high. In addition, a design of a grating waveguide structure arranged at intervals enables an optical loss of the PN junction to be low.

It should be understood that the grating waveguide structure shown in FIG. 8 is arranged along a straight line direction. In a specific implementation, the grating waveguide structure may alternatively be arranged at intervals in a ring shape. Specifically, refer to related descriptions in FIG. 15 and FIG. 16. Details are not described herein again.

Figure 12:
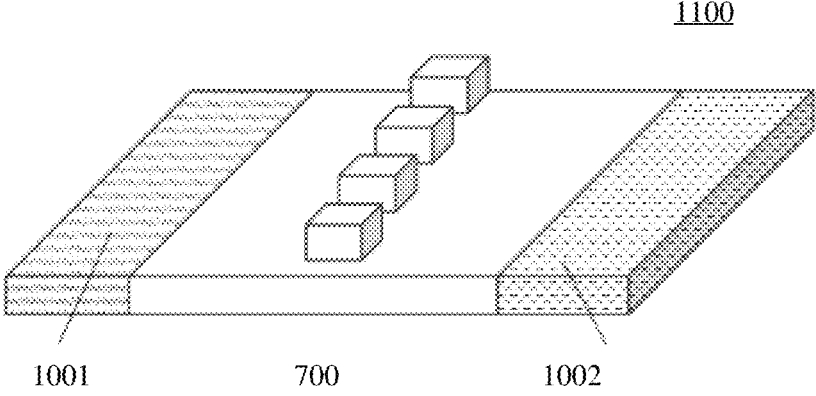
FIG. 12 is a schematic diagram of still another PN junction according to an embodiment of this application.

FIG. 12 is a schematic diagram of a structure of still another PN junction according to an embodiment of this application. As shown in FIG. 12, the PN junction 1100 includes the PN junction 700 shown in FIG. 4, a P+ doped region 1101, and an N+ doped region 1102. The P+ doped region has an ion concentration higher than an ion concentration of the P-type doped region in the PN junction 700, and adjoins the P-type doped region in the PN junction 700 for electrode connection. Similarly, the N+ doped region has an ion concentration higher than an ion concentration of the N-type doped region in the PN junction 700, and adjoins the N-type doped region in the PN junction 700 for electrode connection. It should be understood that the PN junction 700 in this embodiment may be replaced with the PN junction in the foregoing other embodiments, for example, the PN junction shown in FIG. 8. Beneficial effects of the PN junction in this embodiment are similar to those in the foregoing embodiments. Details are not described herein again.

Figure 13:
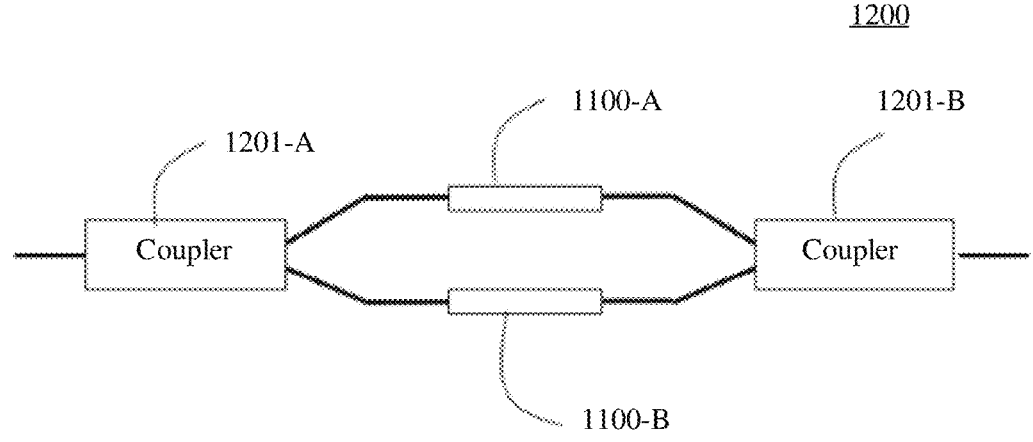
FIG. 13 is a schematic diagram of a structure of a modulator according to an embodiment of this application.

FIG. 13 is a schematic diagram of a structure of a modulator according to an embodiment of this application. As shown in FIG. 13, a modulator 1200 is a Mach-Zehnder modulator, and includes two couplers 1201-A and 1201-B, two PN junctions (1100-A and 1100-B), a plurality of electrodes (not shown in the figure), and a plurality of waveguides (not marked in the figure). Specifically, one end of the coupler 1201-A is an input end of the modulator, and the other two ends of the coupler 1201-A are respectively coupled to the PN junction 1100-A and the PN junction 1100-B through waveguides. The PN junction 1100-A and the PN junction 1100-B are coupled to the coupler 1201-B through waveguides, and the coupler 1201-B provides an output end of the modulator. The two PN junctions are the PN junction 1100 shown in FIG. 12. By applying a reverse bias voltage to the two PN junctions through electrodes, light split into the two PN junctions through the coupler 1201-A can be modulated to obtain two optical signals. Then, the two optical signals are combined by the coupler 1201-B and then outputted.

In a possible implementation, a quantity of the plurality of electrodes is two, and the electrodes are configured to be connected to a negative drive signal and a positive drive signal, respectively. For example, the two electrodes may be located on two sides of the two PN junctions. In another implementation, a quantity of the plurality of electrodes is five, and the electrodes are configured to be grounded, be connected to a negative drive signal, be grounded, be connected to a positive drive signal, and be grounded, respectively. For example, four of the five electrodes may be distributed on the two sides of the two PN junctions, and the other electrode is located between the two electrodes. It should be noted that relative positions of the electrodes and the PN junctions described in this embodiment are only examples. In a specific implementation, the electrodes may be placed in another manner.

Figure 14:
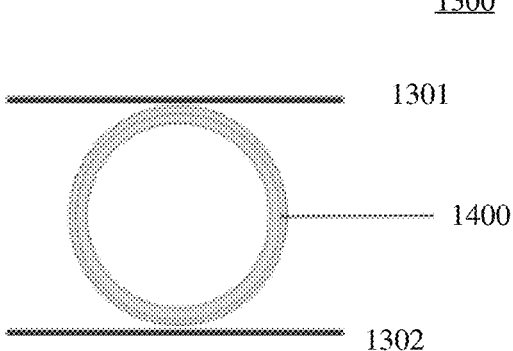
FIG. 14 is a schematic diagram of a structure of another modulator according to an embodiment of this application.

FIG. 14 is a schematic diagram of a structure of another modulator according to an embodiment of this application. As shown in FIG. 14, a modulator 1300 is a microring modulator, and includes a ring waveguide type PN junction 1400 and two waveguides (1301 and 1302). Specifically, the two waveguides 1301 and 1302 are respectively provided on two sides of the ring waveguide type PN junction 1400, and the two waveguides are parallel. The two waveguides form four ports of the modulator, and a working principle of the modulator is common sense of a person skilled in the art. Details are not described herein again. It should be understood that a basic parallel relationship in this application includes a strict parallel relationship or a parallel relationship that has a slight error but does not affect performance of the modulator. This error may be introduced due to a producing process or another reason.

Figure 15:
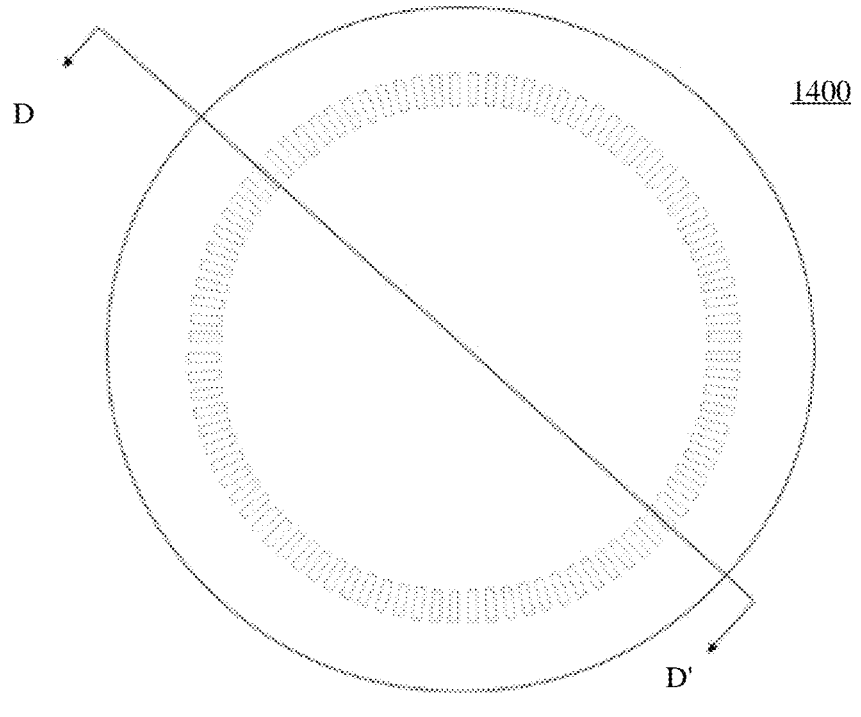
FIG. 15 is a top view of still another possible PN junction according to an embodiment of this application.
Figure 16:
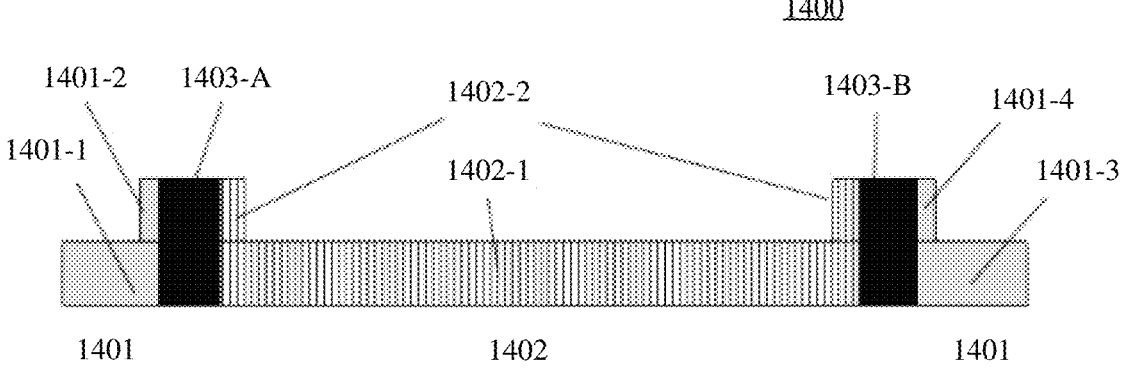
FIG. 16 is a cross-sectional view of the PN junction shown in FIG. 15.

The ring waveguide type PN junction 1400 is further described below with reference to FIG. 15 and FIG. 16. FIG. 15 is a top view of still another possible PN junction according to an embodiment of this application. FIG. 16 is a cross-sectional view of the structure of the PN junction shown in FIG. 15. Specifically, FIG. 16 is a cross-sectional view of the PN junction shown in FIG. 15 along a D-D' direction.

As shown in FIG. 15, a schematic top view of the ring waveguide type PN junction 1400 is similar to the schematic top view of the PN junction shown in FIG. 4 or FIG. 8, and is divided into two layers (a slab waveguide layer and a grating-shape waveguide layer with a plurality of waveguide blocks arranged at intervals), and a carrier-depletion region has a distribution similar to an S shape or a straight line (not shown in the figure). It is different from the foregoing two PN junction embodiments that, waveguides arranged at intervals on an upper layer of the ring waveguide type PN junction 1400 shown in FIG. 15 are arranged in a ring shape. The ring in this application may be an annular shape, an oval shape, a runway shape, or the like. This is not limited in embodiments of this application. It should be noted that the P-type doped region and the N-type doped region of the ring waveguide type PN junction 1400 are similar. As shown in FIG. 16, the ring waveguide type PN junction 1400 includes a P-type doped region 1401, an N-type doped region 1402, and carrier-depletion regions (1403-A and 1403-B). Specifically, the P-type doped region 1401 is divided into two layers. In the cross-sectional view shown in FIG. 16, a lower layer includes 1401-1 and 1401-3, and the upper layer includes 1401-2 and 1401-4. Similarly, the N-type doped region 1402 is divided into two layers. In the cross-sectional view, the lower layer includes 1402-1 and the upper layer includes 1402-2. The ring waveguide type PN junction shown in FIG. 15 and FIG. 16 can be implemented by using a conventional vertical ion doping process, and an optical loss and modulation efficiency performance of the ring waveguide type PN junction are better than that of the PN junction shown in FIG. 1.

It should be understood that the slab waveguide layer shown in FIG. 15 is circular. In an actual implementation, the slab waveguide layer may alternatively be of another structure, for example, a square or an ellipse. This is not limited in this application.

For example, regions (the P+ doped region and the N+ doped region) that are of the ring waveguide type PN junction 1400 and that are configured to be connected to two electrodes may be respectively provided on 1402-1 (to be specific, above the slab waveguide layer and inside the ring waveguide layer) and 1401 (to be specific, above the slab waveguide layer and outside of the ring waveguide). A specific design of the electrodes is not limited in this application.

It should be noted that the foregoing two types of modulators may be used as optical switches or optical filters. This is not limited in this application.

Finally, it should be noted that the foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for preparing a PN junction, comprising:

etching an optical waveguide along a first direction by using a group of first masks as a barrier, to form a grating waveguide structure on a surface of the optical waveguide, wherein:

the group of first masks are a plurality of masks arranged at intervals, the grating waveguide structure comprises a plurality of waveguide blocks arranged at intervals, and a thickness of the grating waveguide structure is less than a thickness of the optical waveguide;

implanting P-type ions into the optical waveguide in a first implantation direction by using the group of first masks as a first barrier, wherein:

an included angle between the first implantation direction and the first direction is in (10, 80) degrees, an included angle between the first implantation direction and an arrangement direction of the plurality of masks is in (0, 90) or (90, 180) degrees, an included angle between the first implantation direction and a second direction is in (0, 90) or (90, 180) degrees, and the second direction is perpendicular to both the arrangement direction of the plurality of masks and the first direction; and implanting N-type ions into the optical waveguide in a second implantation direction by using the group of first masks as a second barrier, to form a carrier-depletion region of the PN junction at a boundary between a region in which the P-type ions are located and a region in which the N-type ions are located, wherein:

an included angle between the second implantation direction and the first direction is in (10, 80) degrees, when the included angle between the first implantation direction and the arrangement direction of the plurality of masks is in (0, 90) degrees, an included angle between the second implantation direction and the arrangement direction of the plurality of masks is in (90, 180) degrees, or when the included angle between the first implantation direction and the arrangement direction of the plurality of masks is in (90, 180) degrees, the included angle between the second implantation direction and the arrangement direction of the plurality of masks is in (0, 90) degrees, and when the included angle between the first implantation direction and the second direction is in (0, 90) degrees, an included angle between the second implantation direction and the second direction is in (90, 180) degrees, or when the included angle between the first implantation direction and the second direction is in (90, 180) degrees, the included angle between the second implantation direction and the second direction is in (0, 90) degrees.

2. The method according to claim 1, further comprising:

before implanting P-type ions into the optical waveguide in the first implantation direction, providing a second mask on the region in which the N-type ions are located.

3. The method according to claim 1, further comprising:

before implanting N-type ions into the optical waveguide in the second implantation direction, providing a third mask on the region in which the P-type ions are located.

4. The method according to claim 1, wherein an included angle between the second implantation direction and the first implantation direction along an axisymmetric direction of the first direction is less than 10 degrees.

5. The method according to claim 1, wherein the included angle between the first implantation direction and the first direction is 45 degrees, and the included angle between the second implantation direction and the first direction is 45 degrees.

6. A PN junction, comprising:

a first waveguide region; and a second waveguide region, wherein:

the first waveguide region is on the second waveguide region, the first waveguide region comprises a plurality of third waveguides arranged at intervals along a first direction, the second waveguide region comprises a first P-type doped region and a first N-type doped region, the first P-type doped region comprises a plurality of first protruding regions, the first N-type doped region comprises a plurality of second protruding regions, the first protruding regions and the second protruding regions are alternately arranged along the first direction, a first carrier-depletion region is formed at a first boundary between the first P-type doped region and the first N-type doped region, and the first carrier-depletion region is in a shape of S connected end to end along the first direction, each of the plurality of third waveguides comprises a second P-type doped region and a second N-type doped region, one second carrier-depletion region is formed at a second boundary between the second P-type doped region and the second N-type doped region of each waveguide of the plurality of third waveguides, and each of the second carrier-depletion regions is S-shaped, a projection of each of the second P-type doped regions on an upper surface of the second waveguide region coincides with a projection of the first P-type doped region on the upper surface of the second waveguide region, a projection of each of the second N-type doped regions on the upper surface of the second waveguide region coincides with a projection of the first N-type doped region on the upper surface of the second waveguide region, and a projection of each of second carrier-depletion regions on the upper surface of the second waveguide region coincides with a projection of the first carrier-depletion region on the upper surface of the second waveguide region.

7. The PN junction according to claim 6, wherein a sum of a spacing between two adjacent waveguides in the plurality of third waveguides and a width of any one of the plurality of third waveguides along the first direction is less than 500 nanometers.

8. The PN junction according to claim 6, wherein a width of any one of the plurality of third waveguides along the first direction is less than 250 nanometers.

9. The PN junction according to claim 6, wherein a material of the first waveguide region or the second waveguide region comprises silicon or a group III-V material.

10. The PN junction according to claim 6, wherein the first carrier-depletion region and each of the second carrier-depletion regions are implemented by ion-implantation doping at an inclined angle.

11. The PN junction according to claim 6, wherein the first direction is a straight line.

12. The PN junction according to claim 6, wherein the first direction is a ring.

13. A Mach-Zehnder modulator, comprising:
a plurality of waveguides;
two PN junctions;
two couplers; and
electrodes,
wherein:
one of the PN junctions comprises a first waveguide region and a second waveguide region,
the first waveguide region is provided on the second waveguide region,
the first waveguide region comprises a plurality of third waveguides arranged at intervals along a first direction,
the second waveguide region comprises a first P-type doped region and a first N-type doped region, the first P-type doped region comprises a plurality of first protruding regions, the first N-type doped region comprises a plurality of second protruding regions, the first protruding regions and the second protruding regions are alternately arranged along the first direction, a first carrier-depletion region is formed at a first boundary between the first P-type doped region and the first N-type doped region, the first carrier-depletion region is in a shape of S connected end to end along the first direction, each of the plurality of third waveguides comprises a second P-type doped region and a second N-type doped region, one second carrier-depletion region is formed at a second boundary between the second P-type doped region and the second N-type doped region of each waveguide of the plurality of third waveguides, a projection of each of the second P-type doped regions on an upper surface of the second waveguide region coincides with a projection of the first P-type doped region on the upper surface of the second waveguide region, a projection of each of the second N-type doped regions on the upper surface of the second waveguide region coincides with a projection of the first N-type doped region on the upper surface of the second waveguide region, a projection of each of the second carrier-depletion regions on the upper surface of the second waveguide region coincides with a projection of the first carrier-depletion region on the upper surface of the second waveguide region, two ends of each of the two PN junctions are respectively connected to the two couplers through the plurality of waveguides, respectively, one of the two couplers comprises an input end of the modulator, and the other of the two couplers comprises an output end of the modulator, and the electrodes are configured to apply voltages to the two PN junction to change phases of light inputted to the two PN junctions.

14. The modulator according to claim 13, wherein:
a quantity of the electrodes is two, and
the two electrodes are configured to be connected to a negative drive signal and a positive drive signal, respectively.

15. The modulator according to claim 13, wherein:
a quantity of the electrodes is five, and
the five electrodes are configured to be grounded, be connected to a negative drive signal, be grounded, be connected to a positive drive signal, and be grounded, respectively.

16. The modulator according to claim 13, wherein a sum of a spacing between two adjacent waveguides in the plurality of third waveguides and a width of any one of the plurality of third waveguides along the first direction is less than 500 nanometers.

17. The modulator according to claim 13, wherein a width of any one of the plurality of third waveguides along the first direction is less than 250 nanometers.

18. The modulator according to claim 13, wherein a material of the first waveguide region or the second waveguide region comprises silicon or a group III-V material.

19. The modulator according to claim 13, wherein each of the second carrier-depletion regions is S-shaped.

20. The modulator according to claim 13, wherein the first carrier-depletion region and each of the second carrier-depletion regions are implemented by ion-implantation doping at an inclined angle.

* * * * *